Patented Dec. 1, 1931

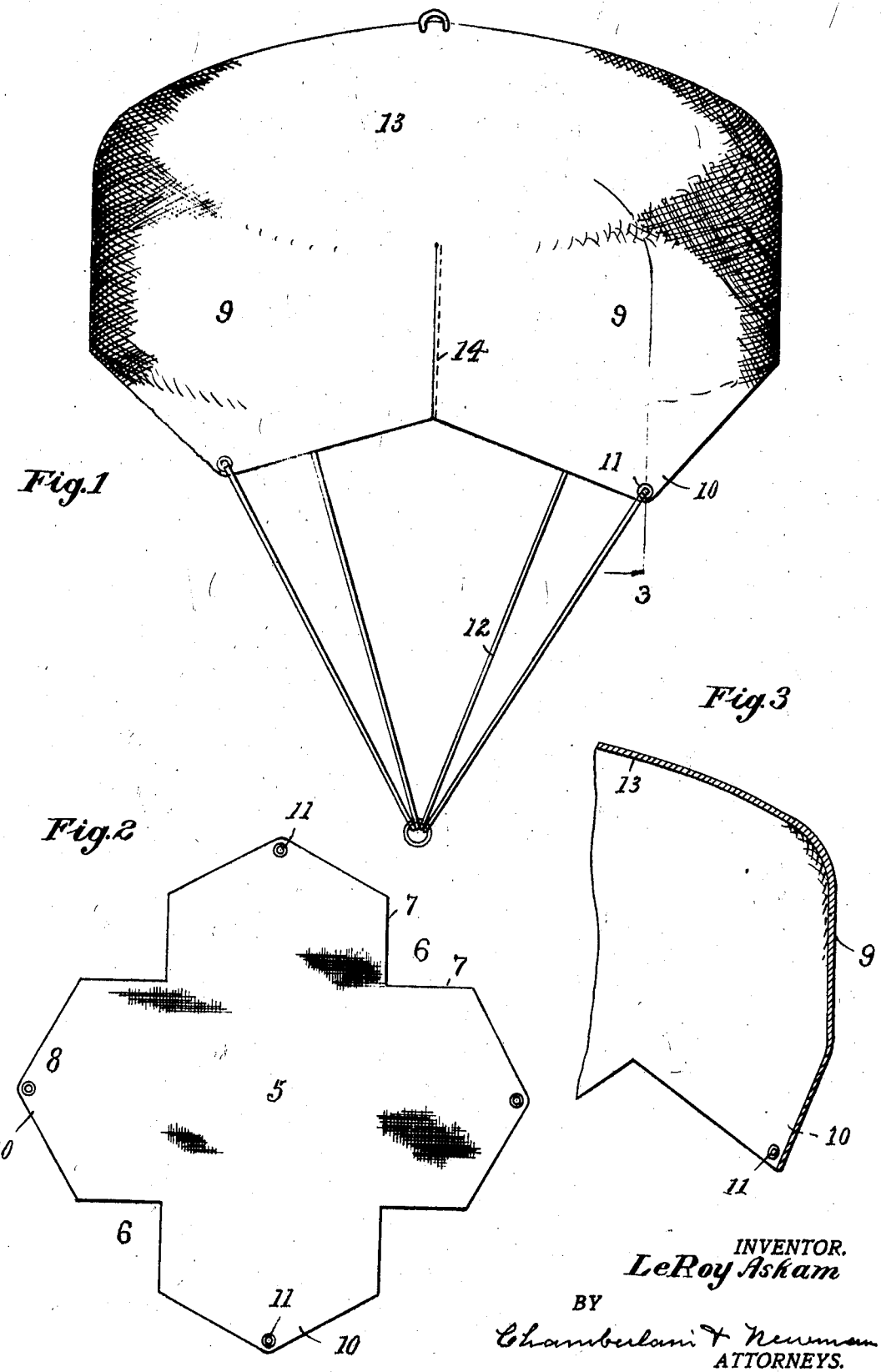

1,834,370

UNITED STATES PATENT OFFICE

LEROY ASKAM, OF MILFORD, CONNECTICUT

PARACHUTE

Application filed March 6, 1930. Serial No. 433,646.

This invention relates to improvements in parachutes such as are used in connection with aeroplane flights and used by the operators as life saving devices in making landings should the same become necessary, or for the landing of articles such as mail bags, express matter, etc., that is intended to be delivered to cities over which the plane is to pass, in order to avoid stopping.

The object of the invention is to simplify the construction of parachutes of this type and to provide one wherein greater resistance to the air will be afforded with a limited width of parachute and whereby the parachute will open and become effective quicker than is the case with the umbrella type of parachutes now commonly used.

Further, to provide a parachute which will right itself more quickly after being released from a plane and will have less tendency to stagger about in the air or float off as is the case with the above mentioned type of parachutes. The parachute is further designed so that it may be cut and formed in a simple manner, and whereby a minimum number of suspension ropes might be employed to an advantage instead of the very much greater number as now used. It being obvious that the greater the number of ropes the more liability of them becoming tangled or otherwise delay the opening of the parachute under the load which it is designed to carry.

With the above objects in view I have designed a parachute which when opened in the air under a load provides a large air pocket having distinct relatively vertical side walls adapted to catch and carry the air under the pressure of the load and thereby making it less liable to descend in an angular position and lose its maximum amount of resistance.

With these and other objects in view, the invention resides and consists in the construction and novel combination and arrangement of parts hereinafter more fully described, illustrated in the accompanying drawings, and pointed out in the claim hereto appended, it being understood that various changes in the form, proportion, size, and minor details of construction within the scope of the claim may be resorted to without departure from the spirit, or sacrificing any of the advantages of the invention.

Similar characters of reference denote like or corresponding parts throughout the several figures of the accompanying drawings forming a part of this specification and upon which Fig. 1 shows a perspective elevational view of a parachute constructed in accordance with my invention;

Fig. 2 is an open plan view of a large sheet prepared and cut for seaming, of a parachute construction in accordance with my invention; and Fig. 3 is a cross sectional view cut throughout the side and a part of the top of the parachute as on line 3 of Fig. 1.

Referring in detail to the characters of reference marked upon the drawings, it will be seen that my parachute is formed of a blank 5, so to speak, which obviously may be made up of a series of strips of silk or other suitable material. This blank, see Fig. 1, includes a central solid flat portion having an irregular-shaped edge produced by forming therein a series of notches 6 having two intersecting edges 7 that are disposed at right angles to each other. These notches, so formed, provide extensions 8 which are used to form the annular depending sides 9 of the parachute, the opposite portions of said sides being disposed downward in parallel relation.

The outer edge portions of these extensions are tapered from the side edges to the center to form a central suspension portion 10 having an eyelet 11 therein for the attachment of suspension chains or ropes 12. In the formation of the parachute the extensions are folded down in a way to bring the edges of the adjacent extensions into overlapping engagement where they are secured together by stitching or otherwise forming seams 14.

In the formation of the parachute the extensions are folded downward from the central portion that forms the top 13 in a way to bring the edges 7—7 of the adjacent extensions into overlapping engagement where they are secured together by stitching or otherwise, forming the four seams 14 in the side of the parachute and which seams when the parachute is inflated, as in Fig. 1, are disposed substantially vertical and in parallel relation one with the other.

When these seams are closed as above suggested, the before mentioned extensions obviously form the annular side portions of the parachute while the pointed ends further extend downward for the attachment of the ropes 12. This structure thus forms an inverted bag-like parachute, open of course upon its underside, and which when filled out forms a rounded top 13 and an annular side or apron that may be of a greater or less depth according to the size of the pocket desired. This parachute, when released in the air, is less liable to give trouble by the tangling of the cords and will insure a more graceful, slower and dependable descent than is now possible with other types of parachutes.

Having thus described my invention, what I claim and desire to secure by Letters Patent is:

A parachute made of fabric and formed from a blank having alternate notches and extensions formed around its peripheral edge portions, the two edges of the notch being cut at substantially a right angle, one to the other, and having said edges of each notch secured together to form an annular depending side wall, a portion of each of the depending extensions projecting below the seams, and lines attached to each of the projections.

Signed at Bridgeport, in the county of Fairfield and State of Connecticut, this 5th day of March, A. D. 1930.

LEROY ASKAM.